(12) United States Patent
Globus et al.

(10) Patent No.: US 7,459,498 B2
(45) Date of Patent: Dec. 2, 2008

(54) FILLED PERFLUOROPOLYMER COMPOSITION

(75) Inventors: Yevgeniy I. Globus, Littleton, MA (US);
Mark A. Jozokos, Pelham, NH (US);
John L. Netta, Newark, DE (US);
George Martin Pruce, Glastonbury, CT (US); Sundar Kilnagar Venkataraman, Vienna, WV (US)

(73) Assignees: E. I. du Pont de Nemours and Company, Wilmington, DE (US); Alpha Gary Corporation, Leominster, PA (US)

( * ) Notice: Subject to any disclaimer, the term of this patent is extended or adjusted under 35 U.S.C. 154(b) by 630 days.

(21) Appl. No.: 11/039,517

(22) Filed: Jan. 19, 2005

(65) Prior Publication Data

US 2005/0187328 A1 Aug. 25, 2005

Related U.S. Application Data

(60) Provisional application No. 60/539,039, filed on Jan. 23, 2004.

(51) Int. Cl.
*C08L 27/12* (2006.01)
*C08K 3/00* (2006.01)
*C08K 3/22* (2006.01)
*H01B 3/44* (2006.01)

(52) U.S. Cl. ............ 524/520; 524/430; 524/432; 522/156; 428/36.9; 428/402; 174/110 FC

(58) Field of Classification Search ......... 524/520, 524/432, 430; 522/156; 174/110 FC; 428/36.9, 428/402

See application file for complete search history.

(56) References Cited

U.S. PATENT DOCUMENTS

| 3,125,547 | A | * | 3/1964 | Blatz ................... 525/199 |
| 4,686,144 | A | | 8/1987 | Hupfer et al. |
| 4,749,752 | A | | 6/1988 | Youlu et al. |
| 4,960,624 | A | | 10/1990 | Ueno |
| 5,320,789 | A | | 6/1994 | Nishii et al. |
| 5,677,404 | A | | 10/1997 | Blair |
| 5,888,424 | A | | 3/1999 | Ebnesajjad et al. |
| 6,743,508 | B2 | * | 6/2004 | Kono et al. ............. 428/402 |
| 6,797,760 | B1 | * | 9/2004 | Ebrahimian et al. ...... 524/445 |

FOREIGN PATENT DOCUMENTS

| EP | 0 076 130 | | 4/1983 |
| EP | 0 857 756 | A1 | 8/1998 |
| JP | 62285939 | | 12/1987 |
| JP | 03281557 | | 12/1991 |
| JP | 04063849 | | 2/1992 |
| JP | 07216278 | | 8/1995 |
| WO | WO 01/80253 | A1 | 10/2001 |

* cited by examiner

*Primary Examiner*—Fred M Teskin

(57) ABSTRACT

The present invention relates to plenum cables jacketed with a composition comprising perfluoropolymer, inorganic char-forming agent, and hydrocarbon polymer, which passes the NFPA-255 burn test.

20 Claims, No Drawings

FILLED PERFLUOROPOLYMER COMPOSITION

BACKGROUND OF THE INVENTION

1. Field of the Invention

This invention relates to filled compositions of perfluoropolymer.

2. Description of Related Art

Plenum cable is cable used for data and voice transmission that is installed in building plenums, i.e. the spaces above dropped ceilings or below raised floors that are used to return air to conditioning equipment. The cable comprises a core which performs the transmission function and a jacket over the core. Typical core constructions include a plurality of twisted pairs of insulated wires or coaxially-positioned insulated conductors.

Cable jackets of polyvinyl chloride (PVC) and flame retardant additives are known for plenum cable, but the resultant compositions do not pass the National Fire Protection Association (NFPA)-255 burn test (Surface Burning of Building Materials), which requires non-flammability and low-to-no smoke emission. UL 2424, Appendix A, provides that cables tested in accordance with NFPA-255 must have a smoke developed index (hereinafter Smoke Index) of no greater than 50 and a flame spread index (Flame Spread Index) of no greater than 25. Heretofore, these attributes of plenum cable jackets have been evaluated by UL-910 (NFPA-262—Standard Method of Test for Flame Travel and Smoke of Wires and cables for Use in Air-Handling Spaces), but as concerns about fire safety have risen, it has been found that cable jackets of PVC composition that pass the NFPA-262 test do not pass the more severe NFPA-255 test.

Cable jackets of tetrafluoroethylene/hexafluoropropylene (FEP) copolymer are also known for plenum cable, that do pass the NFPA-255 burn test. Such FEP has a melt flow rate (MFR) of 2-7 g/10 min, which means that it has a high melt viscosity. Because of this high melt viscosity, this FEP has the disadvantage of high production cost cable jacket, because this FEP is only capable of being extruded at a rate (line speed) of up to about 120 ft/min. Higher MFR (lower melt viscosity) FEP has been tried as cable jacket, but such jacket does not pass the NFPA-255 test. As the MFR increases above 7 g/10 min, the resultant lower melt viscosity of the FEP causes it to drip and smoke, resulting in a Smoke Index of greater than 50. It is noteworthy that this FEP is not flammable, i.e. it simply melts and drips and does not form a carbonaceous char. The same is true with other high MFR melt-fabricable perfluoropolymers.

BRIEF SUMMARY OF THE INVENTION

The present invention satisfies the need for a polymer composition that is sufficiently non-flammable, non-dripping, and non-smoke emitting during exposure to fire that the composition passes the NFPA-255 burn test, i.e. has a Smoke Index of no greater than 50 and Flame Spread Index of no greater than 25. The composition satisfying this need comprises perfluoropolymer, about 10-60 wt % char-forming inorganic agent, and about 0.1 to 5 wt % hydrocarbon polymer that is thermally stable at the melting temperature of said perfluoropolymer, to total 100 wt % based on the combined weight of said perfluoropolymer, agent and hydrocarbon polymer. This composition as a melt blend such as a melt-extruded article, passes the NFPA-255 burn test.

The perfluoropolymers used in the present invention do not, by themselves, pass the NFPA-255 burn test. The combination of just the char-forming inorganic agent and the perfluoropolymer tends to improve the performance of the perfluoropolymer in the burn test, but, typical of highly filled polymer, the physical properties of the melt-fabricated product formed from the composition deteriorate. The hydrocarbon polymer is necessary to obtain a perfluoropolymer composition that both passes the NFPA-255 burn test and has good physical properties. As one skilled in the art will recognize, the ability of the composition of the present invention to pass the NFPA-255 burn test is demonstrated by melt-fabricating an article from the composition and subjecting that article to the burn test. In this regard, the composition of the present invention is especially useful as cable jacket for plenum cable, the jacket being formed by extrusion over and onto the core of the cable. The jacket of composition of the present invention can be considered to pass the NFPA-255 burn test when the entire cable when subjected to the test, passes the test. This is confirmed by substituting a jacket such as of a polyvinyl chloride composition over the same cable core, such cable failing the burn test because the jacket does not pass this test. Thus, it is clear that when the jacket of the composition of the present invention is responsible for the cable passing the test, the jacket itself can be considered to pass the burn test.

Because of the rigor of the NFPA 255 burn test, it is critical that the composition not contain ingredients that promote burning. Thus the composition should be free of ingredients that degrade during melt processing. Antioxidant may be present in the hydrocarbon polymer as-supplied, and this small amount of antioxidant, if present, seems harmless. Antioxidant that would otherwise be added to a composition containing the hydrocarbon polymer to protect it during melt processing should not be so-added to the composition of the present invention. The same is true for other additives; for example, plasticizers should not be present in the composition of the present invention.

The exception to the use of flammable ingredients in the composition of the present invention is the hydrocarbon polymer, which because of its hydrocarbon nature, is flammable and therefore flame spreading and smoke producing. The NFPA-255 burn test applied to plenum cable involves exposing multiple lengths of the jacketed cable to burning, e.g. the common cable that contains four twisted pairs of insulated conductors will typically require more than 100 lengths of such cable laid side-by-side for exposure to burning. These 100+ lengths of cable, each jacketed with a composition of the present invention, result in a substantial amount of fuel (hydrocarbon polymer) being present in the burn test furnace. Surprisingly, the cable jacket of composition of the present invention, notwithstanding the presence of the hydrocarbon polymer, passes the NFPA-255 burn test, both with respect to lack of flame spreading and to creation of smoke.

DETAILED DESCRIPTION OF THE INVENTION

The perfluoropolymers used in the composition of the present invention are those that are melt-fabricable, i.e. they are sufficiently flowable in the molten state that they can be fabricated by melt processing such as extrusion, to produce products having sufficient strength so as to be useful. The melt flow rate (MFR) of the perfluoropolymers used in the present invention is relatively high, preferably at least about 10 g/10 min, more preferably at least about 15 g/10 min, even more preferably at least about 20 g/10 min, and most preferably, at least 26 g/10 min, as measured according to ASTM D-1238 at the temperature which is standard for the resin (see for example ASTM D 2116-91a and ASTM D 3307-93). The relatively high MFR of the perfluoropolymers prevents them by themselves from passing the NFPA-255 burn test. As indicated by the prefix "per", the monovalent atoms bonded to the carbon atoms making up the polymer are all fluorine atoms. Other atoms may be present in the polymer end groups, i.e. the groups that terminate the polymer chain. Examples of perfluoropolymers that can be used in the composition of the present invention include the copolymers of tetrafluoroethylene (TFE) with one or more perfluorinated polymerizable comonomers, such as perfluoroolefin having 3 to 8 carbon atoms, such as hexafluoropropylene (HFP), and/or perfluoro (alkyl vinyl ether) (PAVE) in which the linear or branched alkyl group contains 1 to 5 carbon atoms. Preferred PAVE monomers are those in which the alkyl group contains 1, 2, 3 or 4 carbon atoms, respectively known as perfluoro(methyl vinyl ether) (PMVE), perfluoro(ethyl vinyl ether) (PEVE), perfluoro(propyl vinyl ether) (PPVE), and perfluoro(butyl vinyl ether) (PBVE). The copolymer can be made using several PAVE monomers, such as the TFE/perfluoro(methyl vinyl ether)/perfluoro(propyl vinyl ether) copolymer, sometimes called MFA by the manufacturer. The preferred perfluoropolymers are TFE/HFP copolymer in which the HFP content is about 9-17 wt %, more preferably TFE/HFP/PAVE such as PEVE or PPVE, wherein the HFP content is about 9-17 wt % and the PAVE content, preferably PEVE, is about 0.2 to 3 wt %, to total 100 wt % for the copolymer. These polymers are commonly known as FEP. TFE/PAVE copolymer s, generally known as PFA, have at least about 1 wt % PAVE, including when the PAVE is PPVE or PEVE, and will typically contain about 1-15 wt % PAVE. When PAVE includes PMVE, the composition is about 0.5-13 wt % perfluoro(methyl vinyl ether) and about 0.5 to 3 wt % PPVE, the remainder to total 100 wt % being TFE, and as stated above, may be referred to as MFA.

The inorganic char-forming agent is comprised of at least one inorganic compound that forms, including promoting the formation of, a char in the NFPA-255 burn test. In the burn test, the agent does not prevent the perfluoropolymer from burning, because the fluoropolymer is not flammable. By not flammable is meant that the fluoropolymer does not burn in the NFPA-255 burn test, whereby it has a Flame Spread Index of no greater than 25. Instead, the char-forming agent contributes to formation of a char structure that prevents the total composition from dripping, which would lead to objectionable smoke formation and failure of the burn test. It is unexpected that char-forming agent would have any utility when used with non-flammable perfluoropolymer. Although the perfluoropolymer does not burn, it appears that the char-forming agent interacts with the perfluoropolymer during the burn test to prevent the high MFR perfluoropolymer from dripping, whereby the creation of smoke is suppressed. Although the combination of the perfluoropolymer and char-forming agent is melt flowable (extrudable), which suggests that the composition would drip when subjected to burning, the composition does not drip. The char-forming agent thus appears to act as a thixotropic agent in the article of the composition being subjected to burn. This thixotropic effect can be quantified by rheology (oscillatory shear) measurement using an ARES® Dynamic Rheometer as shown in the following Table.

TABLE

Variation of FEP Viscosity with Shear at 340° C.

| Shear (rads/sec) | Viscosity (Pa · s) | | |
| --- | --- | --- | --- |
| | FEP (MFR 7) | FEP (MFR 30) | Composition |
| 100 | 2810 | 1106 | 4919 |
| 10 | 6202 | 1601 | 12673 |
| 1 | 7970 | 1766 | 46186 |
| 0.1 | 8691 | 1860 | 262000 |

In the Table, the MFRs are in g/10 min, and the Composition is the composition of Example 2. The Table shows that the increase in viscosity (complex viscosity) with reduced shear rate is about 3× for the 7 MFR FEP, about 1.6× for the 30 MFR FEP, and about 53× for the composition as the shear rate decreases from 100 rads/s to 0.1 rads/s. The shear rate of 0.1 rads/s is an approximation of the shear condition to which the article melt-fabricated from the composition of the present invention is exposed in applications that may be exposed to fire. The extremely high viscosity of the composition at 0.1 rads/s explains the suppression of dripping of the composition of the present invention. As the shear is increased to the shear that is characteristic of melt fabrication by extrusion, the melt viscosity of the composition decreases to be similar to that of the MFR 30 FEP at the same shear rate.

While the suppression of dripping and therefore suppression of smoke is one manifestation of the char-forming agent used in the present invention, the formation of char is the effect that is visible in the aftermath of the NFPA-255 burn test. Instead of the jacket having the appearance of a misshapen solidified melt, the jacket has the appearance ranging from an intact, unaffected jacket, to areas wherein the jacket exhibits fractures, to areas wherein the jacket is fractured into flakes, and to areas wherein the flakes have fallen off the cable. The fractured portions of the jacket and the flakes thereof can be considered a char in the sense of being a residue of the "burned" jacket. This char however, is not black as would be characteristic if the char were carbonaceous. The C—F chemical bonds of the perfluoropolymer are so strong that the polymer is well known to form volatile fluorocarbon compounds when subjected to burning rather than to decompose to leave a carbon residue. Even if the flakes fall away from the cable, they do not cause smoke such that the cable would fail the NFPA-255 burn test. Plenum cable jacketed with the composition of the present invention passes this rest.

The char-forming agent is thermally stable and non-reactive at the melt processing temperature of the composition, in the sense that it does not cause discoloration or foaming of the composition, which would indicate the presence of degradation or reaction. The agent itself has color, typically white, which provides the color of the melt processed composition. In the burn test however, the formation of char indicates the presence of degradation.

The composition of the present invention is highly filled, the char-forming agent constituting at least about 10 wt % of the composition (total weight of perfluoropolymer, agent, plus hydrocarbon polymer). The amount of agent necessary to form sufficient char will depend on the agent, the particular perfluoropolymer used and its MFR. Some agents are more effective than others, whereby a relatively small amount will suffice for the composition (jacket) to pass the NFPA-255 burn test. Generally, sufficient char can be obtained when the composition contains about 20 to 50 wt % of the inorganic char-forming agent. Examples of char-forming agents are zinc molybdate, calcium molybdate, and metal oxides such as ZnO, $Al_2O_3$, $TiO_2$, and $MgZnO_2$. Preferably the mean particle size of the char-forming agent is no greater than about 3 µm, and more preferably, no greater than about 1 µm, to provide the best physical properties for the composition. Another example of inorganic char-forming agent is ceramic microspheres, such as Zeeospheres® ceramic microspheres available from the 3M Company, which are understood to be alkali alumina silicates, which may have a larger mean particle size than about 3 µm. e.g. as large as about 5 µm, with smaller particle sizes, such as no greater than about 3 µm mean particle size being preferred. Preferably, the mean minimum particle size is at least about 0.05 µm; smaller particle sizes tend to embrittle the composition. In one embodiment of the present invention, the inorganic char forming agent comprises a plurality of char-forming agents. In another embodiment of the present invention, at least one of this plurality of char-forming agents is ceramic microspheres. A preferred composition comprises about 5 to 20 wt % ceramic microspheres and about 20-40 wt % of another char-forming agent, preferably ZnO, to constitute the about 10-60 wt % char-forming agent component of the composition of the present invention.

The hydrocarbon polymer is used in an amount that is effective to provide the physical properties desired. The hydrocarbon polymer itself does not provide the improved physical properties. Instead, the hydrocarbon polymer interacts with the char-forming agent and perfluoropolymer to limit the reduction in tensile properties that the agent if used by itself would have on the perfluoropolymer composition. Without the presence of the hydrocarbon polymer, the melt blend of the perfluoropolymer/char-forming agent tends to be cheesy in appearance, i.e. to lack integrity, e.g. showing cracks and containing loose, unincorporated agent. With the hydrocarbon polymer being present, a uniform-appearing melt blend is obtained, in which the entire char-forming agent is incorporated into the melt blend. Thus, the hydrocarbon polymer acts as a dispersing agent for the char-forming agent, which is surprising in view of the incompatibility of the perfluoropolymer and hydrocarbon polymer. Hydrocarbon polymer does not adhere to perfluoropolymer. Neither does the char-forming agent. Nevertheless and surprisingly, the hydrocarbon polymer acts as a dispersing agent for the char-forming agent. The effectiveness of the dispersion effect of the hydrocarbon polymer can be characterized by the tensile test specimen of the composition of the present invention exhibiting an elongation of at least about 100%, preferably at least about 150%. The specimen also preferably exhibits a tensile strength of at least about 1500 psi (10.3 MPa). Preferably these properties are achieved on cable jacket specimens in accordance with ASTM D 3032 under the operating conditions of the tensile testing jaws being 2 in (5.1 cm) apart and moving apart at the rate of 20 in/min (51 cm/min). A wide variety of hydrocarbon polymers that are thermally stable at the melt temperature of the perfluoropolymer, provide this benefit to the composition. The thermal stability of the hydrocarbon polymer is visualized from the appearance of the melt blend of the composition, that it is not discolored or foamed by degraded hydrocarbon polymer. Since perfluoropolymers melt at temperatures of at least about 250° C., the hydrocarbon polymer should be thermally stable at least up to this temperature and up to the higher melt processing temperature, which will depend on the melting temperature of the particular perfluoropolymer being used and the residence time in melt processing. Such thermally stable polymers can be semicrystalline or amorphous, and can contain aromatic groups either in the polymer chain or as pendant groups. Examples of such polymers include polyolefins such as the linear and branched polyethylenes, including high density polyethylene and Engage® polyolefin thermoplastic elastomer and polypropylene. Additional polymers include siloxane/polyetherimide block copolymer. Examples of aromatic hydrocarbon polymers include polystyrene, polycarbonate, polyethersulfone, and polyphenylene oxide, wherein the aromatic moiety is in the polymer chain. The preferred polymer is the thermoplastic elastomer, which is a block copolymer of olefin units and units containing an aromatic group, commonly available as Kraton® thermoplastic elastomer. Most preferred are the Kraton® G1651 and G1652 that are styrene/ethylene/butylene/styrene block copolymers containing at least 25 wt % styrene-derived units. The hydrocarbon polymer should have a melting temperature or be melt flowable in the case of amorphous hydrocarbon polymers so as to be melt-blendable with the other ingredients of the composition.

The amount of hydrocarbon polymer necessary to provide beneficial effect in the composition will generally be about 0.1 to 5 wt %, depending on the amount of char-forming agent that is present in the composition. Preferably the amount of such polymer present is about 0.5 to 3 wt %, based on the total weight of perfluoropolymer, char-forming agent and hydrocarbon polymer.

The composition of the present invention can be in the form of the physical mixture of the components or a melt blend thereof, and the melt blend can be in the form of the desired melt-fabricated article, such as the jacket of data transmission cable. The composition of the present invention is also dry as is required for melt fabrication, such as by extrusion. By "dry" is meant that the composition is not in the form of a dispersion or suspension in a liquid medium such as would be use for spray coating of a substrate.

The composition of the present invention will typically be subjected to two melt-processing treatments. First, the composition is preferably melt blended, such as by using a twin-screw extruder or a Buss Kneader® compounding machine, to form molding pellets, each containing all three ingredients of the composition. The molding pellets are a convenient form for feeding to melt processing equipment such as for extruding the composition into the fabricated article desired, such as jacket for (on) twisted pair cable. The Buss Kneader® operates by melting the polymer components of the composition and shearing the molten composition to obtain the incorporation of the char-forming agent into the perfluoropolymer with the aid of the hydrocarbon polymer. The residence time of the composition in this type of melt processing equipment may be longer than the residence time in extrusion equipment. To avoid degradation, the Buss Kneader® is operated at the lowest temperature possible consistent with good blending, barely above the melting temperature of the perfluoropolymer, while the extrusion temperature can be considerably higher, because of its shorter residence time. Other additives that do not contribute to flammability or smoke in the NFPA-255 burn test, such as pigment, can also be compounded into the composition of the present invention.

The composition of the present invention is especially useful as the jacket of plenum cable, to enable such cable to pass the NFPA-255 burn test. The most common such cable will contain four twisted pairs of insulated wires, but the jacket can also be applied to form cable of many more twisted pairs of insulated wires, e.g. 25 twisted pairs, and even cable containing more than 100 twisted pairs. It is preferred that the wire insulation of the twisted pairs be also made of perfluoropolymer. It has been found that when the entire wire insulation is replaced by polyolefin, the jacketed cable fails the NFPA-255 burn test.

Jacket made of perfluoropolymer that passes the NFPA burn test has a low melt flow rate, such as about 2-7 g/10 min, which for jacketing for twisted pairs of insulated wires or insulated coaxial wire, is limited to a very low line speed in the extrusion/jacket operation, of about 100 ft/min (30.5 m/min). Compositions of the present invention, notwithstanding their high filler (char-forming agent) content, can be extruded as cable jacket at line speeds of at least about 300 ft/min (91.5 m/min), preferably at about 400 ft/min (122 m/min). Line speed is the windup rate for the cable, which is also the speed of the assemblage of twisted pairs fed through the extruder crosshead to receive the jacket. The rate of extrusion of molten composition is less than the line speed, with the difference in speeds being made up by the draw down ratio of the extruded tube of molten composition drawn down in a conical shape to contact the assemblage of insulated wires. Draw down ratio is the ratio of the annular cross section of the extrusion die opening to the annular cross section of the jacket.

The composition of the present invention, while capable of high speed extrusion cable jacketing, also produces a smooth jacket, which maintains the positioning of the twisted pairs within the jacket, but does not adversely affect electrical properties such as the attenuation of the electrical signal by the cable. The uneven outline (outer surface) of the twisted pairs within the cable should be barely to not at all visible from the exterior of the cable, whereby the outside of the jacket has a smooth appearance not conforming to the topography of the core of twisted pairs of insulated wires. Sometimes this is referred to as a "loose fit" but the fit of the jacket over the twisted pairs is snug enough that the jacket does not slide over the surface of the twisted pairs to form wrinkles.

Articles other than cable jacketing can be advantageously melt fabricated from compositions of the present invention, these articles too passing the NFPA-255 burn test. Examples of such articles include tubing, especially conduit (raceways) for data and voice transmission cable, profiles (spacers) for twisted pair cables, and tape for bundling cables.

In another embodiment of the present invention, the composition further comprises an inorganic phosphor in an effective amount to color said composition when subjected to excitation radiation. The phosphor also similarly colors the article made from the composition so that the manufacturing source of the composition from which the article is made is detectible. U.S. Pat. No. 5,888,424 discloses the incorporation of inorganic phosphor into colorant-free fluoroplastics in very small amounts, up to 450 ppm. The phosphor typically comprises an inorganic salt or oxide plus an activator, the combination of which is sensitive to exposure to radiation in the 200-400 nm wavelength region causing fluorescence in the visible or infrared wavelength region. This fluorescence, constituting emitted radiation, gives a colored appearance to the composition or article made therefrom, which is characteristic of the phosphor. The phosphors disclosed in the '424 patent are useful in the present invention, except that a greater amount is required for the colored appearance to be seen. Thus, in accordance with this embodiment of the present invention, the amount of phosphor is about 0.1 to 5 wt %, preferably about 0.5 to 2 wt %, based on the combined weight of perfluoropolymer, char-forming inorganic agent, hydrocarbon polymer and phosphor. By way of example, the composition of Example 2 is supplemented with 0.5 to 1 wt % of ZnS/Cu:Al phosphor by dry mixing of the phosphor with the other jacket ingredients prior to extrusion, and the resultant jacket when subjected to ultraviolet light of 365 nm wavelength, gives a green appearance to the jacket in the visible wavelength region. When the ultra-violet light source is turned off, the jacket returns to its original white appearance.

It will be noted that the phosphor of Example 30 of the '424 patent includes ZnO, which is the inorganic char-forming agent in the aforesaid Example 2. When this particular char-forming agent is used, an activator such as the Zn of Example 30 of the '424 patent is all that need be added to the composition of the present invention to obtain a similar phosphor effect, i.e. fluorescence to produce a green color. Thus, in another embodiment of the present invention, when the char-forming inorganic agent has the ability to become a phosphor when suitably activated, an effective amount of such activator is added to the composition to produce the phosphor effect.

EXAMPLES

In the Examples below, the three-components: FEP, hydrocarbon polymer, and inorganic char-forming compound are melt-blended together by the following general procedure: The perfluoropolymer compositions are prepared using a 70 millimeter diameter Buss Kneader continuous compounder and pelletizer. A Buss Kneader® is a single reciprocating screw extruder with mixing pins along the barrel wall and slotted screw elements. The extruder is heated to temperatures sufficient to melt the polymers when conveyed along the screw. All ingredients are gravimetrically fed into the Buss Kneader® from one of the multiple feed ports along the barrel. The Buss Kneader® mixes all the ingredients into a homogeneous compound melt. The homogeneous compound melt is fed into a heated cross-head extruder and pelletized. The description of the compositions in terms of "parts" refers to parts by weight unless otherwise indicated.

The general procedure for forming a jacket of the melt blended composition involves extruding the blend as a jacket over a core of four twisted pairs of FEP-insulated wires to form jacketed cable, using the following extrusion conditions: The extruder has a 60 mm diameter barrel, 30:1 L/D, and is equipped with a metering type of screw having a compression ratio with the respect to the barrel of about 3:1 as between the feed section of the screw and the metering section, i.e. the free volume, that is the volume in the extruder barrel that is unoccupied by the screw, wherein the screw flights in the feed section are about 3× the volume within the screw flights within the metering section. For a screw of constant pitch, the compression ratio is the ratio of the flight depth in the feed section to the flight depth in the metering section (metering into the crosshead). The application of heat to the extruder barrel starts with 530° F. (277° C.) in the feed section, increasing to 560° F. (293° C.) in the transition section and then to 570° F. (298° C.) in the metering section. The extruder is fitted with a B&H 75 crosshead. The assemblage of four twisted pairs of FEP-insulated wires is fed though the cross-head and out the die tip of the crosshead. The temperature of the molten fluoropolymer at the die surrounding the die tip is 598° F. (314° C.). The outer diameter of the die tip is 0.483 in (12.3 mm) and the inner diameter of the die is 0.587 in (14.9 mm), with the annular space between the die tip and the I.D. of the die forming the annular space through which a molten tube of FEP is extruded and drawn down to coat the assemblage of twisted pairs of insulated wire. No vacuum is used to draw the extruded tube down onto the core of twisted pairs insulated wires. The draw down ratio is 10:1, the thickness of the jacket being 10 mils (250 μm), and the draw ratio balance is 0.99. Draw ratio balance is the draw ratio of the molten polymer at the I.D. of the die vs. the draw ratio of the molten polymer at the die tip. The line speed is 403 ft/min (123 m/min).

The fire test chamber (elongated furnace) and procedure set forth in NFPA-255 is used to expose 25 ft (7.6 m) lengths of cable to burning along 5 ft (1.5 m) of the 25 ft length (7.6 m) of the furnace, the furnace being operated according to the instructions set out in NFPA-255. The lengths of cable for testing are placed in side-by-side contact with one another so as to fill the test space above the burner of the furnace with a bed of single thickness cable, and the cable is supported by metal rods spanning the furnace and spaced one foot (30.5 cm) apart along the length of the furnace and the length of the cables. Additional support for the cables is provided by steel poultry netting (chicken wire), the poultry netting laying on the metal rods and the cable laying on the poultry netting, as set forth in Appendix B-7.2. A large number of cables, each 25 ft (7.6 m) long, are laid side-by-side on the poultry netting as described above. For the common 4-pair twisted cable, having a jacket thickness of about 10 mils (0.25 mm), more than 100 cables, each 25 feet (7.6 m) in length, are tested at one time.

The Flame Spread Index is determined in accordance with Chapter 3, Appendix A of NFPA-255.

The Smoke Index is determined using the smoke measurement system described in NFPA-262 positioned in an exhaust extension of the furnace in which the burn test is conducted. The smoke measurement system includes a photoelectric cell, which detects and quantifies the smoke emitted by the cable jacket during the 10-minute period of the burn test. The software associated with the photoelectric cell reports the % obscuration in the exhaust stream from the furnace in the ten-minute period, and the area under the % obscuration/time curve is the Smoke Index (see NFPA-255, Appendix A, 3-3.4 for the determination of Smoke Index). The Flame Spread Index and Smoke Index are determined on as-is lengths of cable, i.e. without slitting the jacket lengthwise and without first exposing the cable to accelerated aging. The chemical stability of perfluoropolymer, however, enables the tensile and burn results after aging at 158° C. for seven days to be about as good as the results before aging.

The FEP used as the primary insulation on the twisted pairs of wires used in the Examples has an MFR of 28 g/10 min and contains PEVE comonomer as described in U.S. Pat. No. 5,677,404. The same FEP is used in the jacket composition in the following Examples unless otherwise specified.

Comparative Example

A jacket composed only of the FEP fails the NFPA-255 burn test. Tensile testing of compression molded plaques (ASTM D 638) of the FEP results in tensile strength and elongation of 3259 psi (22.5 MPa) and 350%.

A jacket of the FEP and Kraton® G1651 thermoplastic elastomer (1 wt %) fails the NFPA-255 burn test.

A composition of FEP and 30 wt % ZnO (Kadox® 930) reduces the MFR of the FEP to 20-22 g/10 min, and compression molded plaques exhibit less than desired tensile properties: tensile strength of 1536 psi (10.6 MPa) and elongation of only 106%.

From this comparative Example, it is seen that neither the char-forming agent nor the hydrocarbon polymer alone, with the perfluoropolymer, form a composition that passes the NFPA-255 burn test and has good physical properties.

Example 1

In this Example a number of jacket compositions are described, each containing perfluoropolymer, char-forming agent, and hydrocarbon polymer, each forming test articles exhibiting good physical and electrical properties, and each capable of being extruded at a line speed exceeding 300 ft/min (91.5 m/min) as a jacket over twisted pairs of insulated wires, with the resultant jacketed cable passing the NFPA-255 burn test.

a. The composition 100 parts of FEP, 3.5 parts Kraton® G1651 thermoplastic elastomer, and 30 parts calcium molybdate (mean particle size less than 1 µm), to total 133.5 parts by weight, is melt blended and then extruded. Tape samples (similar to cable jacketing) tested in accordance with ASTM D 412 (5.1 cm/min) exhibit a tensile strength of 1460 psi (10.1 MPa) and elongation of 150%. Test samples also exhibit good electrical and nonflammability properties, as follows: dielectric constant of 2.64 and dissipation factor of 0.004 (ASTM D 150) and an limiting oxygen index (LOI) of greater than 100% (0.125 in (3.2 mm) sample). The lower the dielectric constant, the better; generally a dielectric constant of no greater than 4.0 is considered satisfactory. These test procedures are used on the experiments mentioned below unless otherwise indicated.

b. The composition 100 part FEP, 30 parts Kadox® 920 ZnO mean particle size 0.2 µm, and 3.5 parts Kraton® 1651G thermoplastic elastomer is melt blended and extruded. Tape samples exhibit the following properties: tensile strength 1730 psi (11.9 MPa) and elongation 225%. Test samples also exhibit good electricals and non-flammability: dielectric constant of 2.5, dissipation factor of 0.007, and LOI of greater than 100%.

c. The composition of 100 parts FEP, 3.5 parts Kraton® G1651, 30 parts ZnO (Kadox® 920), and 5 parts calcium molybdate is melt blended and extruded. Tape samples exhibit tensile strength of 1792 psi (12.3 MPa) and elongation of 212%. Dielectric constant is 2.72, dissipation factor is 0.011 and LOI is greater than 100%.

d. The composition of 100 parts FEP, 1 part Kraton®, and 66.66 parts of Onguard® 2 ($MgZnO_2$) is melt blended and extruded to give good extrudate having satisfactory tensile strength and elongation.

e. The composition 100 parts FEP, 5 parts Engage® polyolefin, and 20 parts MgOH/Zn molybdate (Kemguard® MZM), mean particle size less than 1 µm, is melt blended and extruded, and its test samples exhibit tensile strength of 1850 psi (12.8 MPa), elongation of 153% and LOI of 91%.

f. The composition 100 parts FEP, 1.5 parts Kraton® G1651 and 75 parts Cerox® 502 ZnO, mean particle size of 2.2 µm, is melt blended and extruded to give good extrudate. Tensile testing on rod samples (51 cm/min) gives tensile strength of 2240 psi (15.4 MPa) and elongation of 215%.

g. The composition of 100 parts FEP, 3 parts DGDL 3364 (Dow Chemical high density polyethylene, and 75 parts Cerox® 506 ZnO is melt blended and extruded to give good extrudate. Test rods exhibit tensile strength of 1830 psi (12.6 MPa) and elongation of 110%.

h. The composition of 100 parts FEP, 2.5 parts Siltem® 1500 (dried) (siloxane/polyetherimide block copolymer), and 75 parts Cerox® 506 ZnO is melt blended and extruded to give good extrudate. Test rods exhibit tensile strength 1700 psi (11.7 MPa) and 170% elongation.

i. The composition 100 parts FEP, 5 parts Lexan® 141 polycarbonate, 5 parts Kraton® G1651 thermoplastic elastomer, and 50 parts Cerox® 506 ZnO is melt blended and extruded to give good quality extrudate. Rod test samples exhibit tensile strength of 2245 psi (15.5 MPa) and 300% elongation.

j. The composition of 100 parts FEP, 1 part Lexan® 141 polycarbonate, and 75 parts Cerox® 506 ZnO is melt blended and extruded to give good quality extrudate.

k. The composition of 68 wt % FEP, 2 wt % Kraton® G1651 thermoplastic elastomer, and 30 wt % Al$_2$O$_3$ is melt blended and tested for MFR, which is better for the composition (32.3 g/10 min) than the FEP by itself (MFR 31.1 g/10 min).

l. The composition of 100 parts FEP, 30 parts Kadox® 930 ZnO and 2 parts polyethylene (Alathon® 20, MFR 1.9 g/10 min at 190° C.) is melt blended and extruded to give good extrudate. Test rods exhibit a tensile strength of 2026 psi (14 MPa).

Example 2

A jacket having the following composition: FEP 100 parts, aromatic hydrocarbon elastomer (Kraton® G1651) 1 part per hundred parts FEP (pph), and 66.66 pph Kadox® 930 ZnO (mean particle size of 0.33 μm (total weight of composition is 176.66 parts), is formed. The jacket has a wall thickness of 9-10 mil (0.23-0.25 mm) and the overall cable has a diameter of 0.166 in (4.2 mm) and forms a snug fit (exhibiting a cylindrical appearance, not conforming to the surface topography of the core of twisted pairs of insulated wires) over the 4 twisted pairs of insulated wire in the cable. 121 lengths of this cable are simultaneously subjected to the burn test under NFPA-255, with the result being a Flame Spread Index of 0 and a Smoke Index of 29. The surface of the jacket is smooth and the tensile strength and elongation of the rod samples of the composition are 2235 psi (15.4 MPa) and 165%, respectively. The tensile properties of the jacket itself are tested in accordance with ASTM D 3032, wherein a length of jacket is cut circumferentially and is slipped off the cable to form the test specimen. The test conditions are a spacing of 2 in (5.1 cm) between the tensile tester jaws, and the jaws being pulled apart at the rate of 20 in/min (51 cm/min). The jacket specimen so-tested exhibits a tensile strength of 2143 psi (14.8 MPa) and elongation of 301%. The jacket also exhibits a dielectric constant at 100 MHz of 3.32. When the burn test is repeated on this cable after aging at 158° C. for 7 days, it exhibits a Flame Spread Index of 0 and Smoke Index of 25.

When this experiment is repeated except that the FEP insulated twisted pairs of conductors are replaced by polyethylene-insulated twisted pair conductors, the cable burns the length of the furnace during the NFPA-255 burn test. This is a failure due to the combustibility of the polyethylene insulation.

Example 3

The NFPA-255 burn test is carried out on a cable wherein the jacket has the following composition: 100 parts FEP, 3.5 pph Kraton® G1651, and 100 pph Cerox® 506 ZnO (mean particle size less than 1 μm), to total 203.5 parts. The jacket wall thickness varies from 7-13 mils (0.18-0.33 mm) and the cable thickness is 0.186 in (4.7 mm). 108 cable lengths are tested in the NFPA 255 burn test, and the result is Flame Spread Index of 0 and Smoke Index of 23.

Example 4

Similar results as Example 2 are obtained when the jacket composition is: 100 parts FEP, 2.6 pph Kraton® G1651, and 75 pph Cerox® 506 ZnO, to total 177.6 parts, and the jacket wall thickness is 10 mil (0.25 mm) and the cable diameter is 0.186 in (4.7 mm). 108 lengths of the cable are tested in the NFPA-255 burn test, and the results are Flame Spread Index of 0 and Smoke Index of 30.

Example 5

Results similar to Example 2 are obtained when the jacket composition is as follows: 100 parts FEP, 3.5 pph Kraton® G1651, and 50 pph Cerox® 506 ZnO, to total 153.5 parts, and the jacket wall thickness is 8 mils (0.2 mm) and the cable diameter is 0.156 in (4 mm). 129 lengths of cable are tested in the NFPA-255 burn test, and the results are Flame Spread Index of 0 and Smoke Index of 25. The jacket also exhibits a dielectric constant of 3.6 at 100 MHz.

Example 6

Similar results as Example 2 are obtained when the jacket composition is: 100 parts FEP, 3.5 pph Kraton® G1651, and 30 pph Kadox® 920 ZnO, to total 133.5 parts, and the jacket wall thickness is 7 mils (0.18 mm) and the cable diameter is 0.169 in (4.3 mm). 119 lengths of cable are tested in the NFPA-255 burn test and the results are Flame Spread Index of 1 and Smoke Index of 40.

Example 7

In this Example, the composition of Example 2 is varied by replacing some of the Kadox® 930 ZnO by Zeeospheres® ceramic microspheres W-210 having a mean particle size of 3 μm, and the composition is extruded as a smooth jacket to form coaxial cable comprising a central copper conductor, a foamed plastic insulation, a metal braid surrounding the foamed insulation, and the jacket.

In one extrusion run, the jacket composition has only 46.7 parts of Kadox® per hundred parts of FEP and has 20.0 parts per hundred of the ceramic microspheres (11.93 wt % of the composition). In another extrusion run, the same proportion of ceramic microspheres is present, but the Kraton® is replaced by the same amount of Siltem® 1500. In another extrusion run, the ceramic microsphere content is decreased to 10 parts per hundred parts of FEP and the same hydrocarbon polymer (Siltem® 1500) is used, the proportion of ceramic microspheres in this composition being 5.96 wt %. All of these jacket compositions provide an advantage over the Example 2 composition in exhibiting no spark faults in wire line testing applying a voltage of 3000V to the jacket at a line speed of about 53 m/min for at least 2 min. The jacket for coaxial cable is prone to spark faults because of the underlying metal braid. Use of the ceramic microspheres to constitute at least part of the char-forming agent in the jacket eliminates spark faults. In still another extrusion run, the jacket composition contains less Kadox® than Example 2, i.e. 50 parts per hundred parts of FEP, 1.0 part of Siltem® 1500 instead of the 1 part of Kraton®, and additionally 2.5 parts of Aerosil® R-972 fumed silica per 100 parts of FEP. This jacket too exhibits no spark faults.

All of these jacket compositions are also applied as a jacket over four twisted pairs of insulated wire for comparison of the burn/smoke generation performance (NFPA-255) with the jacket of Example 2, and these jacket compositions performs as well as the Example 2 jacket in this regard.

Example 8

This Example addresses another surprising property of the jacket composition, namely that upon burning, the volatile combustion products of the jacket composition are surprisingly low in acid amount and acidity. The procedure for determining these combustion products simulates burning by subjecting a sample of the composition to high heat in the presence of oxygen for a sufficient time to consume all of the composition and analyzing the resultant volatile products for acid generation and acidity. The volatilization of the composition in the presence of oxygen leads to the formation of fluoro-acids.

In greater detail, the procedure of MIL C-24643 is followed. According to this procedure a sample weighing 0.50 g is heated in a silica tube to 800° C. over a 40-minute heat-up period and is held at that temperature for 20 min. During this heating, air is passed through the tube at the rate of 1 liter/min. Also during this heating, all gases generated by the volatilizing sample are fed into an absorber flask. Upon completion of the heating, the contents of the absorber flask are titrated against 0.1 N NaOH using Congo red as the indicator. The total titer indicates the total soluble acid. For example, 1.0 ml of the 0.1 N NaOH solution (0.1 milliequivalent) is equivalent to 3.65 milligrams of acid assuming the acid formed is hydrochloric acid (HCl) as would be expected from polyvinyl chloride (PVC) compositions. Fluoropolymers would form hydrofluoric acid (HF), for which the equivalence is 2.00 g/0.1 milliequivalent of base (NaOH in this case). The weight of acid found is divided by the sample weight to arrive at the % acid generation.

The foregoing procedure is practiced on the following samples: FEP by itself, a commercial flame retardant PVC jacket composition, and the jacket composition of Example 2, with the FEP by itself being the same as the FEP used in the composition of Example 2. The results are summarized in the Table:

TABLE

Acid Generation and Acidity (pH)

| Sample | Weight (mg) | Titer (ml) | mg acid/ml titer | Acid (mg) | Acid Generation (%) | pH |
|---|---|---|---|---|---|---|
| FEP | 453 | 33.70 | 2.00 | 67.4 | 14.9 | 1.72 |
| PVC composition | 484 | 18.26 | 3.65 | 66.65 | 13.78 | 1.90 |
| Example 2 composition | 460 | 1.94 | 2.00 | 3.88 | 0.84 | 3.01 |

It is preferred that the jacket composition exhibit an acid generation of no greater than 5% and an acidity characterized by a pH of at least 2.4. the jacket composition of the present invention easily surpasses these values. As shown in the Table, the presence of the metal oxide char-forming agent in the Example 2 composition reduces the acid generation by a factor of greater than 10 as compared to the FEP by itself and also as compared to the PVC composition. The difference between a pH of less than 2.0 and 3.0 is a greater than tenfold change in acid concentration. The pH of the acid gases from the Example 2 composition compares favorably with pH of the acid gases obtained when subjecting a flame retardant halogen-free polymer (polyolefin) to the above procedure.

The greatly reduced gas generation of the jacket composition according to the present invention enhances safety for occupants and fire fighters in a building subjected to fire and containing cable jacketed with composition according to the present invention by greatly reducing obscuration caused by smoke and the possibility of debilitating irritancy also caused by the smoke. The reduced acid gas generation and reduced acidity of the jacket composition of the present invention also leads to less corrosion of sensitive equipment in the vicinity of the fire.

What is claimed is:

1. A composition consisting essentially of perfluoropolymer, about 10-60 wt % char-forming inorganic agent, and about 0.1 to 5 wt % hydrocarbon polymer that is thermally stable at the melting temperature of said perfluoropolymer, to total 100 wt % based on the combined weight of said perfluoropolymer, agent and hydrocarbon polymer.

2. Melt-fabricated article of the composition of claim 1.

3. The melt fabricated article of claim 2 wherein said hydrocarbon polymer disperses said agent in said perfluoropolymer.

4. Cable jacket, tubing, profiles and tape of the melt-fabricated article of claim 2.

5. Pellets of the composition of claim 1.

6. The composition of claim 1 wherein said agent is in the form of particles having a mean particle size of no greater than about 3 micrometer.

7. The composition of claim 1 wherein said agent is metal oxide.

8. The composition of claim 7 wherein said metal oxide is ZnO.

9. A composition comprising perfluoropolymer, about 10-60wt% char-forming inorganic agent, and about 0.1 to 5 wt% hydrocarbon polymer that is thermally stable at the melting temperature of said perfluoropolymer, to total 100 wt% based on the combined weight of said perfluoropolymer, agent and hydrocarbon polymer, wherein said hydrocarbon polymer is thermoplastic elastomer.

10. The composition of claim 9 wherein said thermoplastic elastomer contains aromatic moiety.

11. A composition comprising perfluoropolymer, about 10-60 wt% char-forming inorganic agent, and about 0.1 to 5 wt% hydrocarbon polymer that is thermally stable at the melting temperature of said perfluoropolymer, to total 100 wt% based on the combined weight of said perfluoropolymer, agent and hydrocarbon polymer, wherein said composition is free of added antioxidant.

12. The composition of claim 1 exhibiting an acid generation of no greater than about 5% and an acidity characterized by a pH of at least about 2.5 determined in accordance with MIL C-24643.

13. The composition of claim 1 further comprising an inorganic phosphor in an effective amount to color said composition when subjected to excitation radiation.

14. The composition of claim 1 wherein said agent is ceramic microspheres.

15. The composition of claim 1 wherein said agent comprises a plurality of char-forming agents, at least one of which is ceramic microspheres.

16. Process comprising melt fabricating the composition of claim 1 and obtaining as a result thereof a dispersion of said agent in said perfluoropolymer.

17. The composition of claim 1 wherein said composition contains 20 to 50 wt% of said char-forming agent.

18. The composition of claim 1 wherein said composition contains 0.5 to 3 wt% of said hydrocarbon polymer.

19. The composition of claim 13 wherein the amount of said inorganic phosphor is 0.1 to 5 wt% based on the combined weight of said perfluoropolymer, char-forming agent, hydrocarbon polymer and inorganic phosphor.

20. The composition of claim 1 wherein said composition contains 20 to 50 wt% of said char-forming agent and 0.5 to 3 wt% of said hydrocarbon polymer.

* * * * *

UNITED STATES PATENT AND TRADEMARK OFFICE
CERTIFICATE OF CORRECTION

PATENT NO.        : 7,459,498 B2
APPLICATION NO.   : 11/039517
DATED             : December 2, 2008
INVENTOR(S)       : Yevgeniy I. Globus et al.

It is certified that error appears in the above-identified patent and that said Letters Patent is hereby corrected as shown below:

TITLE PAGE ITEM 73 IN THE ASSIGNEES:

"Alpha Gary Corporation, Leominster, PA (US)" should appear as --AlphaGary Corporation, Leominster, MA (US)--.

Signed and Sealed this

Twenty-second Day of June, 2010

David J. Kappos
*Director of the United States Patent and Trademark Office*